(12) United States Patent
Artemiadis et al.

(10) Patent No.: US 10,800,031 B2
(45) Date of Patent: *Oct. 13, 2020

(54) SPHERICAL PARALLEL MANIPULATOR ARCHITECTURE FOR SHOULDER ROBOTIC EXOSKELETON

(71) Applicant: Arizona Board of Regents on behalf of Arizona State University, Tempe, AZ (US)

(72) Inventors: Panagiotis Artemiadis, Tempe, AZ (US); Hyunglae Lee, Tempe, AZ (US); Justin Hunt, Tempe, AZ (US)

(73) Assignee: Arizona Board of Regents on behalf of Arizona State University, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/318,180

(22) PCT Filed: Jul. 26, 2017

(86) PCT No.: PCT/US2017/043851
§ 371 (c)(1),
(2) Date: Jan. 16, 2019

(87) PCT Pub. No.: WO2018/022692
PCT Pub. Date: Feb. 1, 2018

(65) Prior Publication Data
US 2019/0217465 A1    Jul. 18, 2019

Related U.S. Application Data

(60) Provisional application No. 62/367,034, filed on Jul. 26, 2016.

(51) Int. Cl.
*B25J 9/00* (2006.01)
*A61H 1/00* (2006.01)
*A61H 1/02* (2006.01)

(52) U.S. Cl.
CPC ............. *B25J 9/0006* (2013.01); *B25J 9/003* (2013.01); *A61H 1/0281* (2013.01); *A61H 2201/1638* (2013.01); *A61H 2201/1673* (2013.01)

(58) Field of Classification Search
CPC ....... B25J 9/0006; B25J 9/003; A61H 1/0281; A61H 3/00; A61H 2201/5097;
(Continued)

(56) References Cited

U.S. PATENT DOCUMENTS 6,301,526 B1   10/2001   Kim et al.
9,707,442 B2    7/2017   Artemiadis et al.
(Continued)

FOREIGN PATENT DOCUMENTS

WO   2008031023 A2   3/2008
WO   2014070672 A1   5/2014
(Continued)

OTHER PUBLICATIONS

International Search Report and Written Opinion issued for PCT/US2017/043851 dated Nov. 9, 2017.
(Continued)

*Primary Examiner* — Quang D Thanh
(74) *Attorney, Agent, or Firm* — Polsinelli PC

(57) ABSTRACT

Implementations involve a shoulder exoskeleton having a spherical parallel manipulator with a plurality of parallel linear actuators connected to a base coupled to a user's arm. A passive slip mechanism is operatively coupled to the spherical parallel manipulator as well as being coupled to the user's arm. The slip mechanism increases system mobil-
(Continued)

ity and prevents joint misalignment caused by the translational motion of the user's glenohumeral joint from introducing mechanical interference.

**8 Claims, 15 Drawing Sheets
(3 of 15 Drawing Sheet(s) Filed in Color)**

(58) Field of Classification Search
CPC .... A61H 2201/5071; A61H 2201/5069; A61H 2201/5007; A61H 2201/1673; A61H 2201/165; A61H 2201/1635; A61H 2201/1616; A61H 2201/1215; A61H 2201/0192; A61H 2205/062
See application file for complete search history.

(56) References Cited

U.S. PATENT DOCUMENTS

| | | | |
|---|---|---|---|
| 9,757,610 B2 | 9/2017 | Artemiadis et al. | |
| 9,833,895 B2 | 12/2017 | Artemiadis et al. | |
| 2007/0225620 A1 | 9/2007 | Carignan et al. | |
| 2007/0255190 A1 | 11/2007 | Sadok | |
| 2010/0016766 A1* | 1/2010 | Zhang | A61F 5/0102 601/5 |
| 2010/0113987 A1* | 5/2010 | Agrawal | A61H 1/0237 601/33 |
| 2010/0249673 A1* | 9/2010 | Nef | A61H 1/0281 601/33 |
| 2011/0251533 A1* | 10/2011 | Han | A61H 1/0274 601/33 |
| 2012/0004581 A1* | 1/2012 | Dinon | A61H 1/0237 601/23 |
| 2012/0101419 A1* | 4/2012 | Bonutti | A61F 5/013 602/20 |
| 2014/0378876 A1* | 12/2014 | Malosio | A61H 1/0266 601/5 |
| 2015/0360069 A1* | 12/2015 | Marti | A63B 21/00178 482/6 |
| 2015/0374573 A1* | 12/2015 | Horst | A61H 3/00 602/16 |
| 2017/0061828 A1 | 3/2017 | Artemiadis et al. | |
| 2017/0348851 A1 | 12/2017 | Artemiadis et al. | |
| 2019/0160653 A1* | 5/2019 | Artemiadis | A61H 1/0281 |

FOREIGN PATENT DOCUMENTS

| | | | |
|---|---|---|---|
| WO | 2015065948 A1 | 5/2015 | |
| WO | 2015084177 A1 | 6/2015 | |
| WO | 2018022689 A1 | 2/2018 | |
| WO | 2018081569 A1 | 5/2018 | |

OTHER PUBLICATIONS

Khatib, O., "Augmented Object and Reduced Effective Inertia in Robot Systems", 1988 American Control Conference (Atlanta, GA, Jun. 15-17, 1988), 1988 (date added to IEEE Xplore Mar. 2009), pp. 2140-2147 <DOI:10.23919/ACC.1988.4790078>.
Klein, J. et al., "Optimization of a Parallel Shoulder Mechanism to Achieve a High-Force, Low-Mass, Robotic-Arm Exoskeleton", IEEE Transactions on Robotics, Aug. 2010 (date of publication Jun. 2010), vol. 26, No. 4, pp. 710-715 <DOI:10.1109/TRO.2010.2052170>.
Mihelj, M. et al., "ARMin II—7 DoF rehabilitation robot: mechanics and kinematics", IEEE International Conference on Robotics and Automation (Roma, Italy, Apr. 10-14, 2007), 2007 (date added to IEEE Xplore May 2007), pp. 4120-4125 <DOI:10.1109/ROBOT.2007.364112>.
Patent Cooperation Treaty, International Searching Authority, International Preliminary Report on Patentability for PCT/US2017/043851, 5 pages, report dated Jan. 29, 2019, opinion dated Nov. 9, 2017.
Patent Cooperation Treaty, International Searching Authority, International Search Report for PCT/US2017/043851, 3 pages, dated Nov. 9, 2017.
Pons, J., "Rehabilitation Exoskeletal Robotics", IEEE Engineering in Medicine and Biology Magazine, May-Jun. 2010 (date of publication May 2010), vol. 29, No. 3, pp. 57-63 <DOI:10.1109/MEMB.2010.936548>.
Roy, A. et al., "Measurement of Human Ankle Stiffness Using the Anklebot", 2007 IEEE 10th International Conference on Rehabilitation Robotics (Noordwijk, Netherlands, Jun. 13-15, 2007), 2007 (date added to IEEE Xplore Jan. 2008), pp. 356-363 <DOI:10.1109/ICORR.2007.4428450>.
Saltaren, R. et al., "Performance evaluation of spherical parallel platforms for humanoid robots", Robotica, 2007 (available online Aug. 2006), vol. 25, No. 3, pp. 257-267 <DOI:10.1017/S0263574706003043>.
Schiele, A. et al., "The ESA Human Arm Exoskeleton for Space Robotics Telepresence", Proceeding of the 7th International Symposium on Artificial Intelligence, Robotics and Automation in Space (NARA, Japan, May 19-23, 2003), 8 pages <DOI:10.13140/RG.2.2.10069.27362>.
Tao, Z. et al., "Interference analysis and workspace optimization of 3-RRR spherical parallel mechanism", Mechanism and Machine Theory, Nov. 2013 (available online Jun. 2013), vol. 69, pp. 62-72 <DOI:10.1016/j.mechmachtheory.2013.05.004>.
Veeger, H., "The position of the rotation center of the glenohumeral joint", Journal of Biomechanics, Dec. 2000 (available online Sep. 2000), vol. 33, No. 12, pp. 1711-1715 <DOI:10.1016/S0021-9290(00)00141-X>.
Vitiello, N. et al., "NEUROExos: A Powered Elbow Exoskeleton for Physical Rehabilitation", IEEE Transactions on Robotics, Feb. 2013 (date of publication Sep. 2012), vol. 29, No. 1, pp. 220-235 <DOI:10.1109/TRO.2012.2211492>.
Walter, D. et al., "A Complete Kinematic Analysis of the SNU 3-UPU Parallel Robot", Contemporary Mathematics, 2009, vol. 496, pp. 331-347 <DOI:10.1090/conm/496/09732>.
U.S. Appl. No. 16/342,764.
Carignan, C. et al., "Design of an arm exoskeleton with scapula motion for shoulder rehabilitation", 12th International Conference on Advanced Robotics (Seattle, WA, Jul. 18-20, 2005), 2005 (date added to IEEE Xplore Sep. 2005), pp. 524-531 <DOI:10.1109/ICAR.2005.1507459>.
Cempini, M. et al., "Self-Alignment Mechanisms for Assistive Wearable Robots: A Kinetostatic Compatibility Method", IEEE Transactions on Robotics, Feb. 2013 (date of publication Nov. 2012), vol. 29, No. 1, pp. 236-250 <DOI:10.1109/TRO.2012.2226381>.
Dasgupta, B. et al., "The Stewart platform manipulator: a review", Mechanism and Machine Theory, Jan. 2000 (available online Sep. 1999), vol. 35, No. 1, pp. 15-40 <DOI:10.1016/S0094-114X(99)00006-3>.
Di Gregorio, R., "Kinematics of the 3-UPU wrist", Mechanism and Machine Theory, Mar. 2003 (available online Dec. 2002), vol. 38, No. 3, pp. 253-263 <DOI:10.1016/S0094-114X(02)00066-6>.
Gan, D. et al., "Forward Kinematics Solution Distribution and Analytic Singularity-Free Workspace of Linear-Actuated Symmetrical Spherical Parallel Manipulators", Journal of Mechanisms and Robots, Nov. 2015 (available online Mar. 2015), vol. 7, No. 4, article 041007, 8 pages <DOI:10.1115/1.4029808>.
Gao, X-S. et al., "Generalized Stewart-Gough platforms and their direct kinematics", IEEE Transactions on Robotics, Apr. 2005, vol. 21, No. 2, pp. 141-151 <DOI:10.1109/TRO.2004.835456>.
Gupta, A. et al., "Design, Control and Performance of RiceWrist: A Force Feedback Wrist Exoskeleton for Rehabilitation and Training", The International Journal of Robotics Research, Feb. 2008, vol. 27, No. 2, pp. 233-251 <DOI:10.1177/0278364907084261>.
Haninger, K. et al., "Kinematic design and analysis for a macaque upper-limb exoskeleton with shoulder joint alignment", IEEE/RSJ International Conference on Intelligent Robots and Systems (Chicago, Il, Sep. 14-18, 2014), 2014 (date added to IEEE Xplore Nov. 2014), pp. 478-483 <DOI:10.1109/IROS.2014.6942602>.

(56) References Cited

OTHER PUBLICATIONS

Harryman, D. et al., "Translation of the humeral head on the glenoid with passive glenohumeral motion", The Journal of Bone & Joint Surgery, Oct. 1990, vol. 72, No. 9, pp. 1334-1343 <DOI:10.2106/00004623-199072090-00009>.

Hunt, J. et al., "A Novel Shoulder Exoskeleton Robot Using Parallel Actuation and a Passive Slip Interface", Journal of Mechanisms and Robotics, 2017 (available online Nov. 2016), vol. 9, No. 1, article 011002, 7 pages <DOI:10.1115/1.4035087>.

Hunt, J. et al., "Development of a Novel Shoulder Exoskeleton Using Parallel Actuation and Slip", ASME 2016 Dynamic Systems and Control Conference (Minneapolis, MN, Oct. 12-14, 2016), 7 pages <DOI:10.1115/DSCC2016-9894>.

Jarrasse, N. et al., "Connecting a Human Limb to an Exoskeleton", IEEE Transactions on Robotics, Jun. 2012 (date of publication Dec. 2011), vol. 28, No. 3, pp. 697-709 <DOI:10.1109/TRO.2011.2178151>.

Jiang, Q. et al., "Determination of the maximal singularity-free orientation workspace for the Gough-Stewart platform", Mechanism and Machine Theory, Jun. 2009 (available online Sep. 2008), vol. 44, No. 6, pp. 1281-1293 <DOI:10.1016/j.mechmachtheory.2008.07.005>.

Jung, Y. et al., "Performance verification of a kinematic prototype 5-DOF upper-limb exoskeleton with a tilted and vertically translating shoulder joint", IEEE/ASME International Conference on Advanced Intelligent Mechatronics (Besacon, France, Jul. 8-11, 2014), 2014 (date added to IEEE Xplore Aug. 2014), pp. 263-268 <DOI:10.1109/AIM.2014.6878089>.

\* cited by examiner

SPHERICAL PARALLEL MANIPULATOR ARCHITECTURE FOR SHOULDER ROBOTIC EXOSKELETON

CROSS-REFERENCE TO RELATION APPLICATIONS

The present application claims priority under 35 U.S.C. § 119 to U.S. Provisional Patent Application No. 62/367,034, entitled "Spherical Parallel Manipulator Architecture for Shoulder Robotic Exoskeleton" and filed on Jun. 26, 2016, which is incorporated by reference in its entirety herein.

FIELD

Aspects of the present disclosure relate to systems and methods for mitigating the effects of joint misalignment between a wearable robot, such as a shoulder exoskeleton, and its user and more particularly to an exoskeleton system having a spherical parallel manipulator and a passive slip mechanism.

BACKGROUND

A parallel manipulator is a robotic mechanism that uses multiple actuated parallel linkages to synergistically manipulate the motion of its end-effector. The architecture of these devices can vary considerably, but usually consists of between two and six rotational or linear actuators, which couple a mobile platform to a stationary base. In comparison to the more common serial chain manipulator, parallel manipulators typically offer better end-effector performance in terms of precision, velocity, and torque generation. Parallel manipulators also exhibit lower effective inertia than serial chain manipulators. Furthermore, it is possible to design a parallel manipulator such that it does not occupy its center of rotation. This unique combination of advantages, inherent to parallel manipulation, suggests that this type of robotic architecture would be suitable for exoskeleton limb applications.

Parallel manipulators have been used for several exoskeleton applications. Prior works include wearable wrist, ankle and shoulder devices. All of these demonstrate different types of parallel architecture. The RiceWrist uses a 3-RPS (revolute-prismatic-spherical) manipulator with an additional serial revolute joint to generate four degrees-of-freedom (DoF) that includes the rotation of the forearm, wrist height and 2-DoF in rotation of the end-effector platform. The Anklebot uses a 2-SPS-1S (spherical-prismatic-spherical, spherical) manipulator that consists of spherical joints and prismatic actuation in conjunction with the biological joint to achieve spherical motion. The shoulder exoskeleton BONES uses a RRPS (revolute-revolute-prismatic-spherical) manipulator to decouple and control three rotational DoF. Because all of these devices generate spherical motion through parallel actuation, they can further be categorized as spherical parallel manipulators (SPMs).

These conventional systems, however, may be characterized as either having purely rotational or spherical motion. Although this simplifying assumption is a good approximation for the simpler joints discussed above, it has demonstrated inaccuracy for more complex joints like the shoulder. Rotational motion of the shoulder's clavical and scapula results in translational motion of the glenohumeral joint. Therefore the humerus of the upper arm actually has both rotational and translational motion. Some conventional systems attempt to address this challenge with serial actuated shoulder exoskeletons to more accurately emulate the shoulder's motion by incorporating translational DoF into their designs. However, the choice of using serial actuation has the inherent disadvantages of low stiffness, high inertia, and positioning errors that are accumulated and amplified from base to end-effector.

A solution for emulating the complex rotational and translational motion of the shoulder might be to use a parallel manipulator with a higher degree of actuation. A possibility would be the six linear actuator hexapod design which is known as the Gough-Stewart (GS) platform. This device has control over all 6-DoF of its platform and exhibits good stiffness characteristics, making it ideal for high precision and high load applications. However, the GS platform has limited workspace. This is largely in part to mechanical interference between the device's many parallel linkages. Designing a GS platform with the same range of motion as the shoulder would be difficult. In addition, a fully actuated 6-DoF system is an overly complicated solution to address the relatively small translational motion of the shoulder.

As discovered through the presently disclosed technology, an alternative to using a complicated 4, 5 or 6-DoF controlled parallel manipulator is to use a SPM with an integrated passive slip mechanism. Allowing slip to occur between the user and device could be used to correct for joint misalignment that would otherwise induce force on the user and may cause the mechanism to seize. Using slip also simplifies the control scheme of the parallel manipulators, since the degree of joint misalignment no longer needs to be quantified. However, incorporating slip into conventional SPM designs would be difficult for a shoulder exoskeleton application. The RRPS architecture used with BONES would include four linear actuators to control the 3-DoF of the shoulder, whereas it is desirable to achieve 3-DoF control with only three actuators. The 2-SPS design uses the biological joint as part of the kinematic solution and will not work well with slip. The 3-RRR (rotational-rotational-rotational) "Agile Eye" parallel manipulator uses three rotary actuators and curved linkages to decouple and control the three rotational DoF. However, the 3-RRR's architecture does not interface well with the human shoulder, as its curved linkages pass through the majority of the sphere in which it rotates about. This would cause interference between the user and device. The 3-UPU (universal-prismatic-universal) "Spherical Wrist" parallel manipulator consists of three parallel linear actuators which decouple and control the three rotational DoF but has been shown to exhibit poor stiffness characteristics, which would make it impractical for real world use.

As such, there is a need for mitigating the effects of joint misalignment between a shoulder exoskeleton and its user using a spherical parallel manipulator and a passive slip mechanism.

BRIEF SUMMARY

Implementations claimed herein address the foregoing need by providing an exoskeleton system. In one implementation, a plurality of linear actuators forms a spherical parallel manipulator. Each of the plurality of linear actuators has an actuator endpoint and generates a parallel actuation with a dependent motion coupling across the plurality of actuators. A motion of each of the actuator endpoints is across an arc of motion. The spherical parallel manipulator applies a force component tangential to the motion of each of the actuator endpoints across an entirety of the arc of motion. A cuff is connectable to an arm of a user, and a base connects the spherical parallel manipulator to the cuff.

In another implementation, a plurality of linear actuators forms a spherical parallel manipulator. Each of the plurality of linear actuators generates a parallel actuation with a plurality of degrees of freedom. A subset of the plurality of degrees of freedom across the plurality of linear actuators is arranged in a modular motion coupling. The modular motion coupling defining a spherical workspace centered based on a center of rotation of a shoulder of a user. A slip mechanism is connectable to an arm of the user and has a passive cuff joint with a rotational degree of freedom and a translational degree of freedom. A base connects the spherical parallel manipulator to the slip mechanism.

In another implementation, a spherical parallel manipulator has a plurality of linear actuators generating a motion along an arc of motion with a set of dependent degrees of freedom. An encoder is associated with each of the plurality of linear actuators and records captured data including values corresponding to the set of dependent degrees of freedom. A controller is in communication with the encoder of each of the plurality of linear actuators and controls the motion of the spherical parallel manipulator in a feedback loop based on the captured data.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

The present patent or application file contains at least one drawing executed in color. Copies of this patent or patent application publication with color drawing(s) will be provided by the Office upon request and payment of the necessary fee.

DETAILED DESCRIPTION

Aspects of the present disclose generally relate to a shoulder exoskeleton for a user having a spherical parallel manipulator (SPM) and a passive slip mechanism. In one example implementation, the SPM consists of three parallel linear actuators connected to a base coupled to the user. Each actuator has three degrees-of-freedom (DoF). Two of the DoF are rotational (roll and pitch) and one is translational (stroke). The roll of each actuator is defined to rotate about a vector connecting a base mounting point of the actuator to a center of rotation of a shoulder of the user. The roll is not directly constrained but rather set by synergistic movements of all three actuators. The pitch and length of each actuator are mechanically coupled, such that a workspace is a spherical surface centered about the shoulder of the user. Each actuator may be connected to the base by a 3-DoF tie-rod joint. The base is connected to an arm of the user by a 2-DoF passive joint that allows for 1-DoF of rotational motion and 1-DoF of translational motion. The rotational DoF prevents undesired torques from being applied to the arm of the user during the rolling action of the shoulder exoskeleton. The translational DoF allows slip to occur between the user and the device. Base mounts of each actuator may be situated in close proximity to a back of the user. However, placement of the base mounts is only limited by physical constraints, such as mechanical interference.

Figure 1:
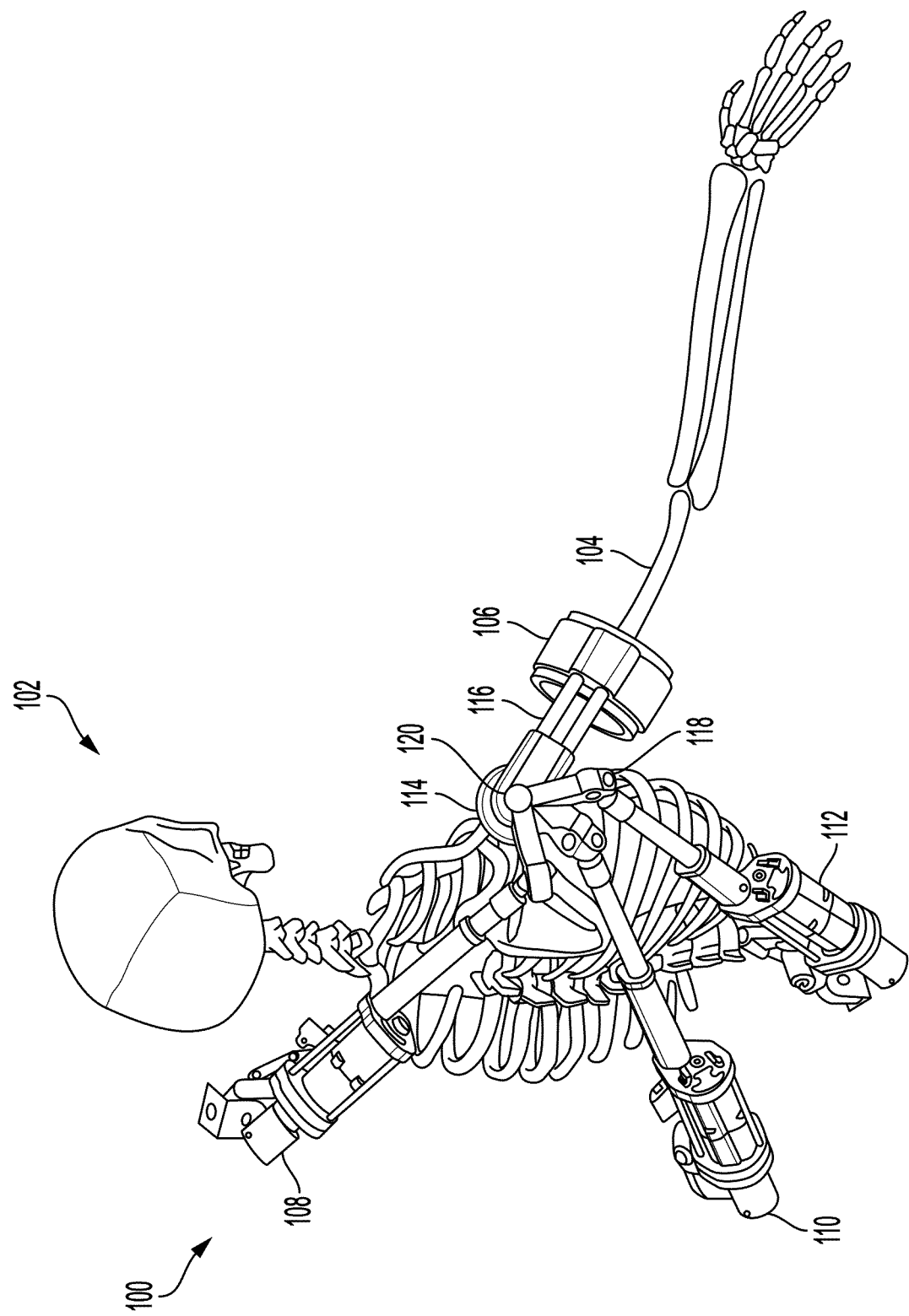
FIG. 1 illustrates a back perspective view of an example shoulder exoskeleton interfacing with a user.
Figure 2:
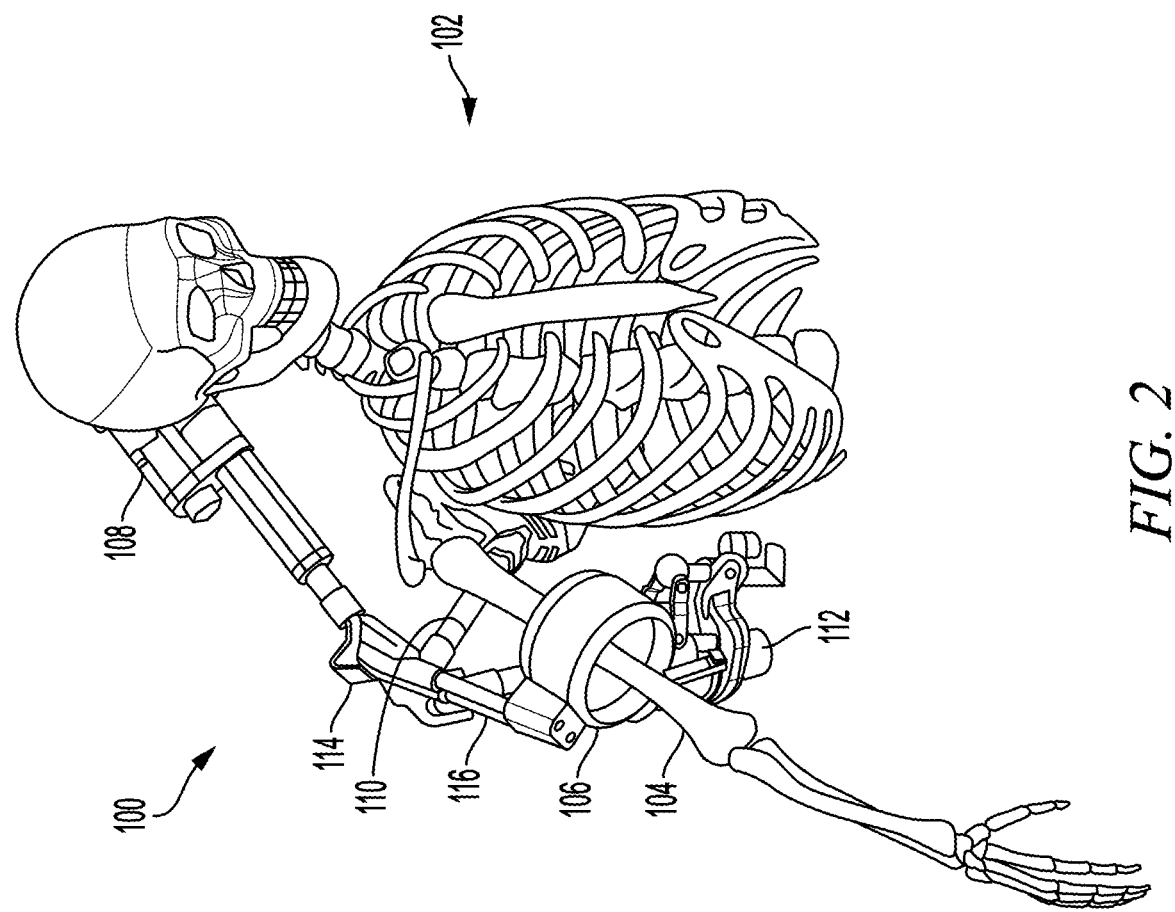
FIG. 2 illustrates a front perspective view of the shoulder exoskeleton interfacing with the user.
Figure 3:
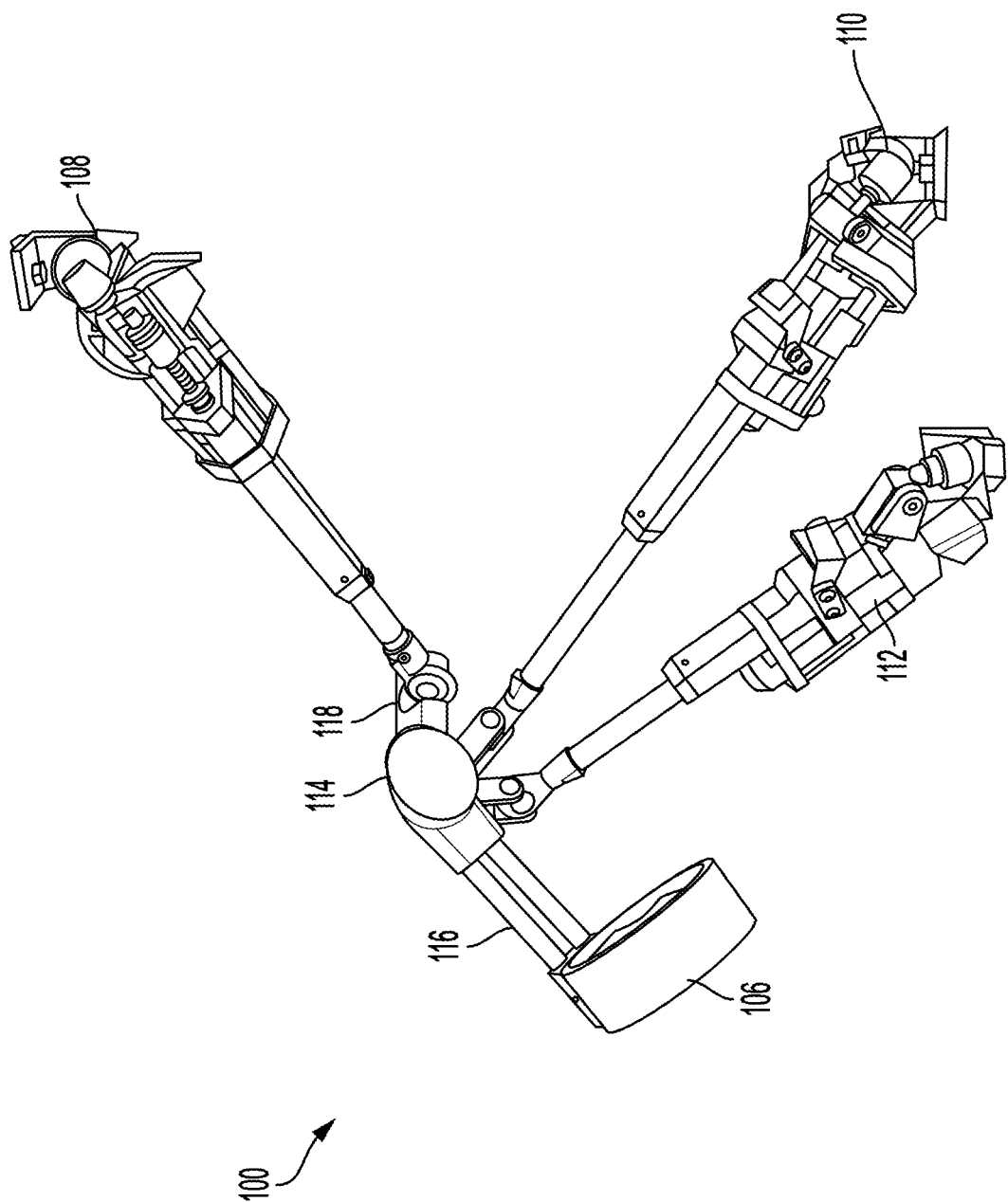
FIG. 3 shows a side perspective view of the shoulder exoskeleton.

To begin a detailed description of an example shoulder exoskeleton 100 for a user 102, reference is generally made to FIGS. 1-3. In one implementation, the shoulder exoskeleton weighs approximately 5.4 kg, excluding a power source, such as batteries, and an off-board controller, such as a computing system described herein. However, other weights are contemplated depending on the materials and the architecture of the shoulder exoskeleton 100. The shoulder exoskeleton 100 may be positioned relative to a shoulder of the user 102 and coupled to an arm 104 of the user 102.

In one implementation, the shoulder exoskeleton 100 includes a slip mechanism 106 and an SPM defined by one or more linear actuators (e.g. a first linear actuator 108, a second linear actuator 110, and a third linear actuator 112), each configured to generate a parallel actuation with a plurality of degrees of freedom. The slip mechanism 106 and each of the linear actuators 108-112 are connected to a base 114. For example, the slip mechanism 106 may be connected to the base 114 with one or more cuff connectors 116, and the linear actuators 108-112 may each be connected to the base with an actuator connector 118. In one implementation, each of the actuator connectors 118 is connected to the base 114 at a center of rotation 120.

Figure 4:
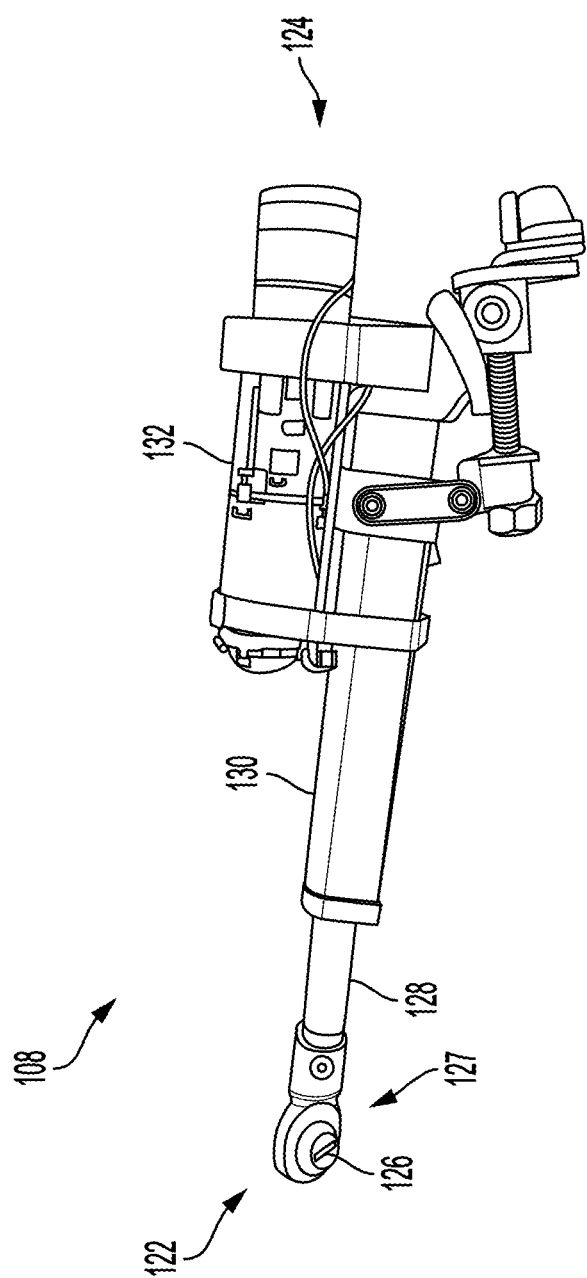
FIG. 4 shows an example linear actuator of the shoulder exoskeleton.

As can be understood from FIG. 4, in one implementation, each of the linear actuators (e.g., the linear actuator 108) extends between a proximal end 122 connectable to the actuator connector 118 and a distal end 124. The proximal end 122 may include a linear actuator endpoint 126, which may include a 3-DoF tie-rod joint for connecting to the base 114. The linear actuator 108 further includes a first actuator member 128 extending from or otherwise translatable within a second actuator member 130. An actuator assembly 132 and an actuator base 138 may be mounted to the second actuator member 130, for example, at the distal end 124.

Figure 5:
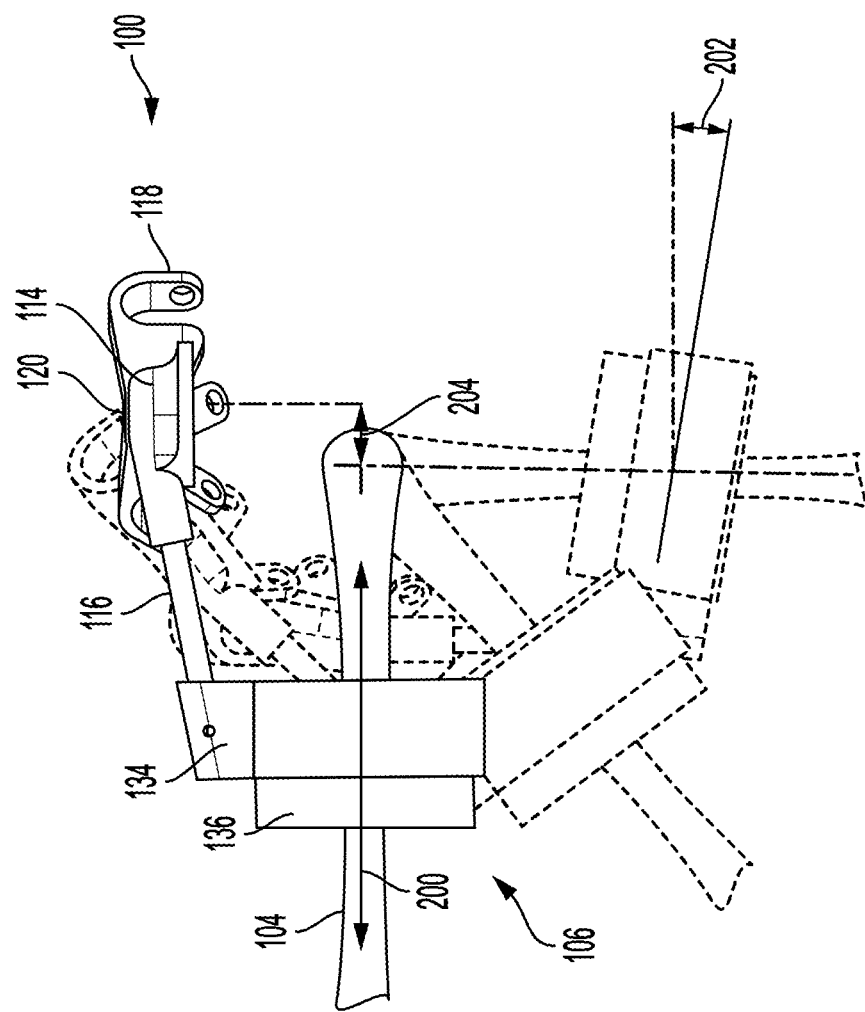
FIG. 5 illustrates an example slip mechanism.
Figure 6:
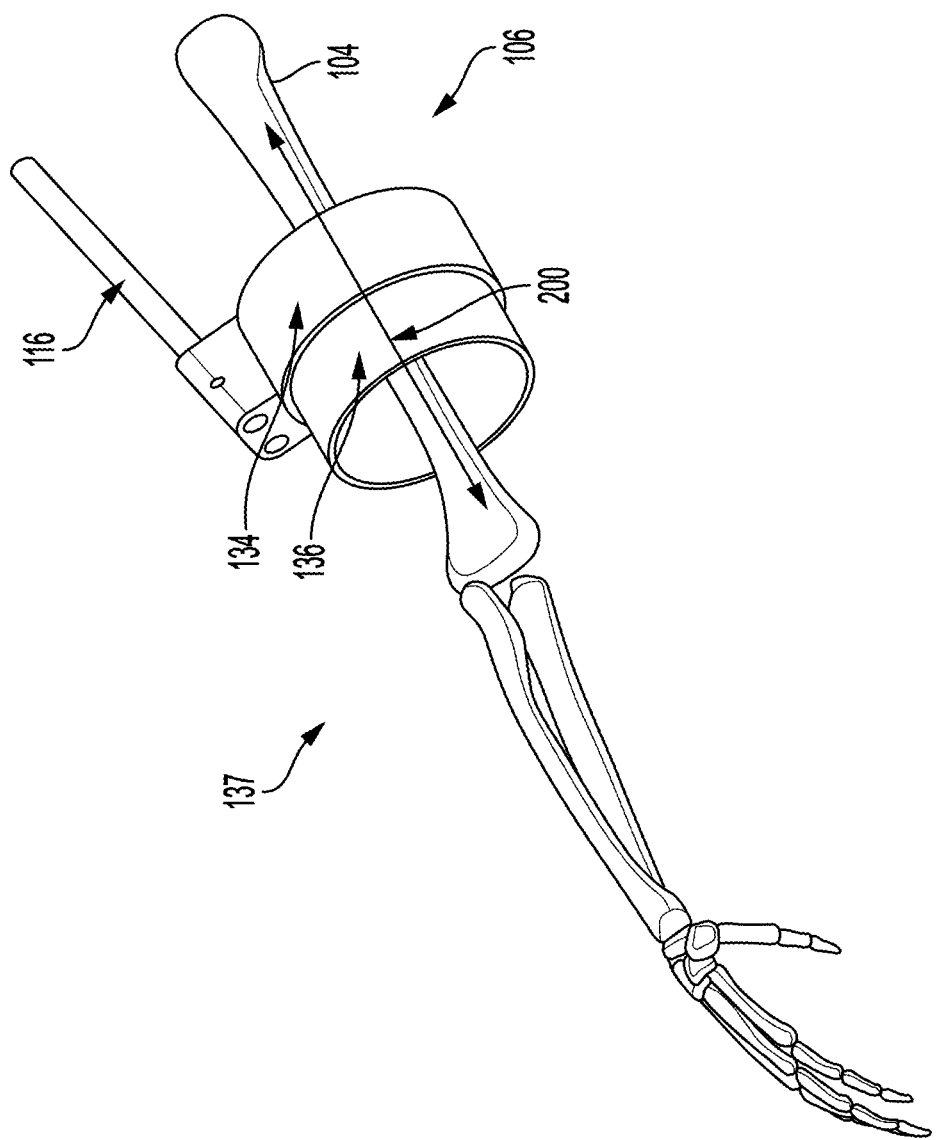
FIG. 6 shows an example passive cuff joint of the slip mechanism.

Turning to FIGS. 5-6, in one implementation, the slip mechanism 106 is a passive cuff joint formed by an external cuff 134 and an inner cuff 136. The external cuff 134 is connected to the cuff connector 116, and the inner cuff 136 is connected to the arm 104 of the user 102. The internal cuff 136 is translatable within the external cuff 134.

The internal cuff 136 and the external cuff 134 may each be a short concentric tube. The tubes may be made from a variety of rigid materials, including, but not limited to, plastic (e.g., ABS plastic), metal, ceramic, and/or the like. The tubes may further have a variety of sizes. For example, the internal cuff 136 may have an internal diameter of approximately 105 mm and a wall thickness of approximately 3.5 mm, while the external cuff 134 may have an internal diameter of approximately 112.5 mm and a wall thickness of approximately 4.0 mm.

The internal cuff 136 may be internally lined with a compliant padding. The compliant padding may have a variety of thicknesses and be made from a variety of materials. For example, the compliant padding may be approximately 20.0 mm thick and made from polyurethane. The compliant padding permits a predetermined amount of diametral padding deformation. For example, the compliant polyurethane padding may permit approximately 30.0 mm of diametral padding deformation. In one implementation, a low friction interface is disposed between the internal cuff 136 and the external cuff 134. For example, the low friction interface may be constructed using bearings, bushings, a low friction liner, and/or the like.

As described herein, in one implementation, when a joint misalignment 204 occurs between the center of rotation 120 of the shoulder exoskeleton 100 and a center of rotation of a glenohumeral joint of the user 102, the internal cuff 136 translates axially within the external cuff 134 as a translational slip 200. This additional passive translational degree of freedom alleviates mechanical interference that would otherwise generate interaction forces. The translational slip 200 of the internal cuff 136 is made possible by the compliant padding, which allows for the cuffs 134 and 136 to remain parallel and avoid harm to the user 102 despite the joint misalignment 204. The maximum misalignment allowed is dependent on a diameter of the arm 104 of the user 102. In addition to the translational slip 200, the joint misalignment will affect a cuff misalignment angle 202 defined by an orthogonal relationship between a cross-section of the cuffs 134 and 136 and the arm 104 of the user.

Figure 7:
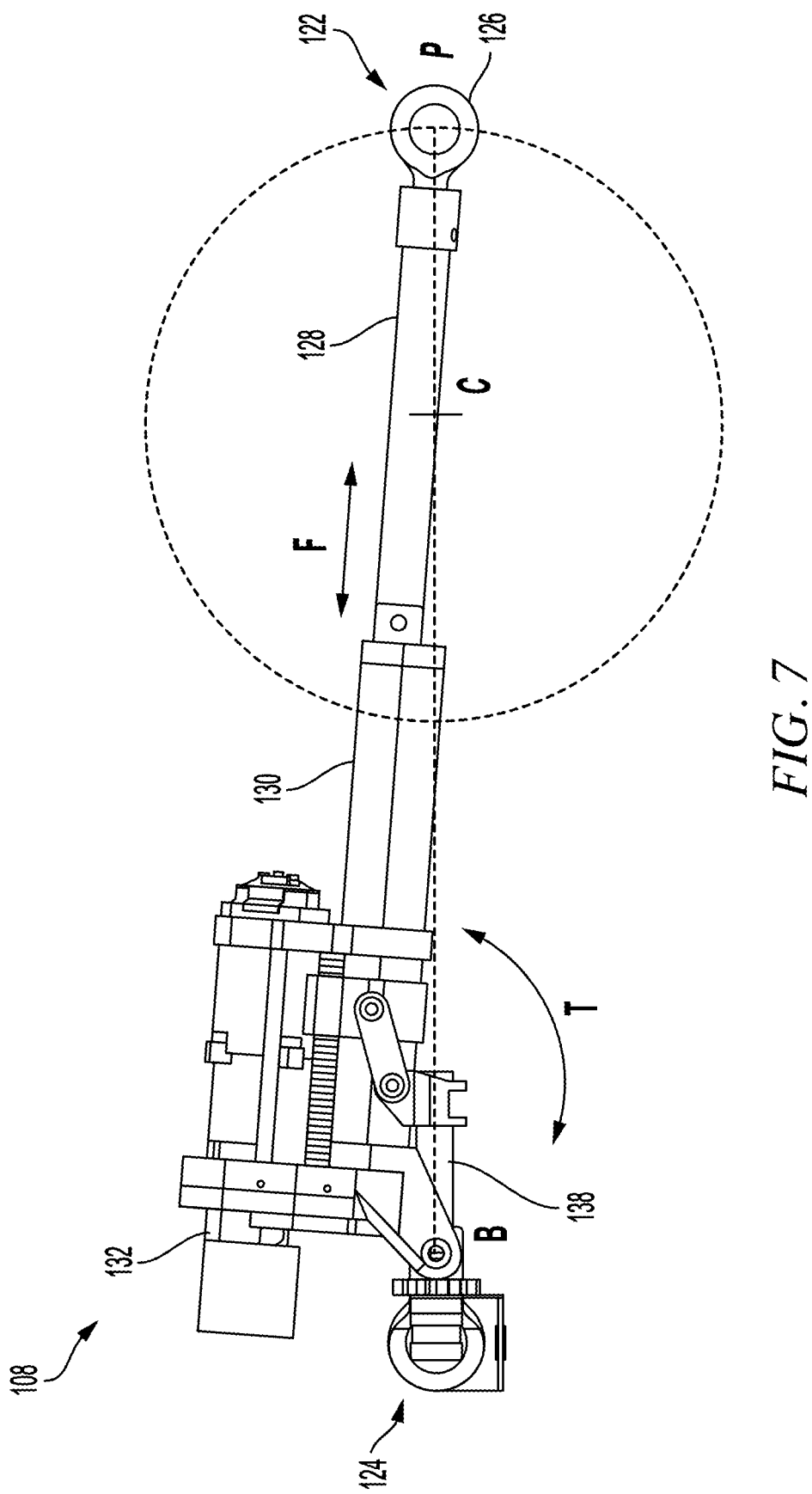
FIG. 7 depicts an example actuator configuration of the spherical parallel manipulator.
Figure 8:
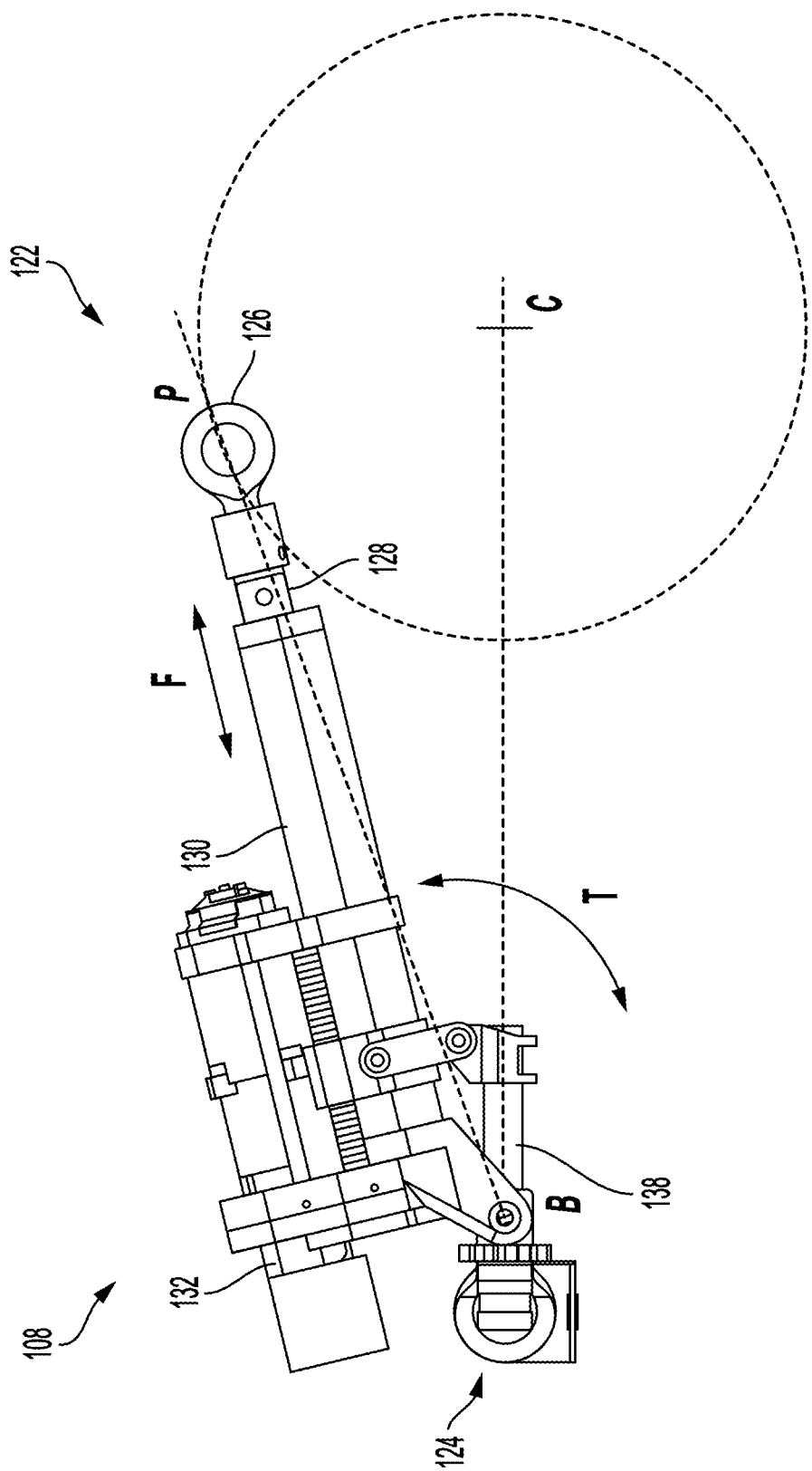
FIG. 8 illustrates another example actuator configuration of the spherical parallel manipulator.

Referring to FIGS. 7-8, in one implementation, a motion of each actuator endpoint 126 of the linear actuators (e.g., the actuator 108) is circular with respect to its current plane, as illustrated by the dotted line. The SPM defined by the linear actuators maintains a force component F tangential to the circular motion to overcome external forces which may otherwise impede the motion of the SPM. Conventionally, SPM technologies do not maintain a consistent tangential force component throughout an entirety of the arc of motion but instead operate on a small subset of this arc in which the tangential forces are comparably high and approximately constant. This conventional approach limits a workspace of the SPM considerably. Conversely, the SPM of the shoulder exoskeleton 100 maintain a tangential force component throughout an entirety of the arc of motion.

Turning first to FIG. 7, a center of rotation C of the SPM, a base mounting point B, and a linear actuator endpoint P all lie on the line BP. Therefore BC and PC are collinear. In this configuration, the action of extending or contracting the linear actuator length alone does not result in a force component tangential to the arc of motion and therefore does not contribute to overcoming external forces acting on the SPM. Consequently, a non-motion coupled linear actuated SPM, such as the 3-UPU, would fail in this instance. With the SPM of the shoulder exoskeleton 100, however, a torque is generated about B as a result of the motion coupling slider and linkage mechanism, which dependently controls the actuator pitch and produces a tangential force component at P in this instant, as described in more detail herein.

Inversely to the SPM shown in FIG. 7, the SMP illustrated in FIG. 8 demonstrates a configuration in which the linear actuator 108 is acting tangential to the arc of motion. In this instant, BP and PC are orthogonal, and the tangential force component is generated entirely by a change in the actuator length and not by a change in the actuator pitch. Therefore, a non-motion coupled rotary actuated SPM, such as the 3-RRR, would fail in this instance.

The SPM of the shoulder exoskeleton 100 is the only technology capable of applying orthogonal forces at the end effector of each actuated leg. As a result of these orthogonal forces, the SPM of the shoulder exoskeleton 100 is the only kind of SPM technology capable of always applying a tangential force component at each of its three actuated legs throughout the entire arc of motion. This is important as it expands the workspace and subsequently the possible application of SPM technology.

Actuator Motion Coupling

Figure 9:
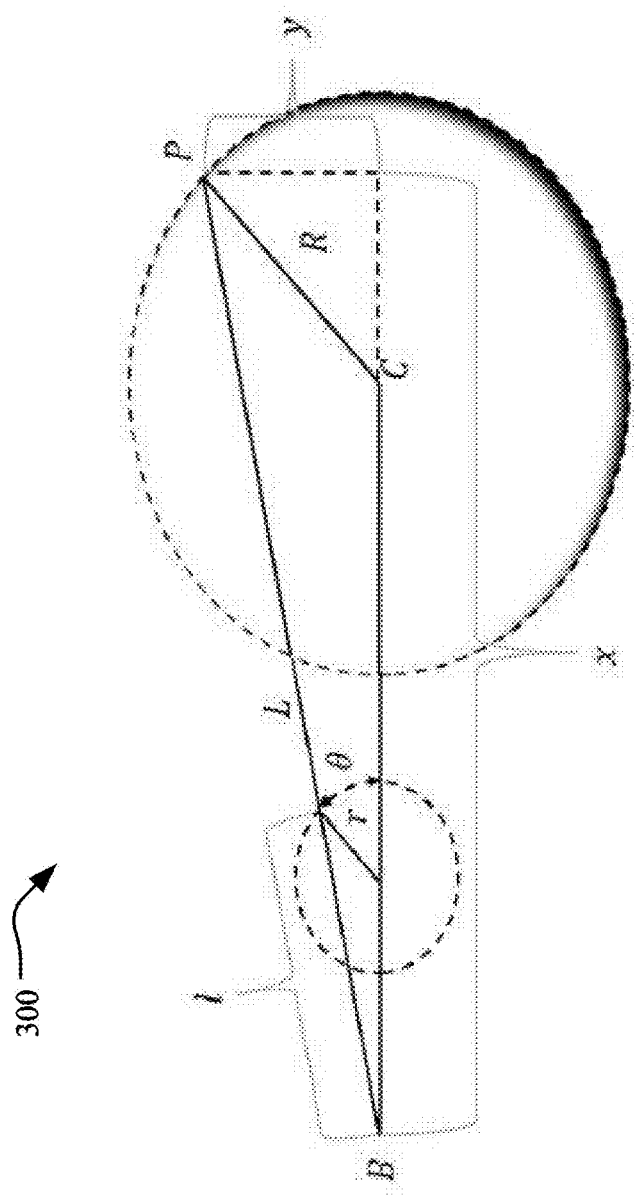
FIG. 9 is a graphical illustration of pitch and stroke coupling using similar triangle relation.

One of the primary features of the SPM of the shoulder exoskeleton 100 is that it uses a novel method of modular motion coupling to produce a device with a single kinematic solution. This method involves coupling certain DoF of each actuator (e.g., 108, 110, and/or 112) independently, thereby constraining the kinematic solutions of the non-coupled system to one correct solution for the coupled system. For the SPM of the shoulder exoskeleton 100, a pitch angle θ and a length L of each independent actuator are coupled such that all possible kinematic solutions lie on a sphere centered about a shoulder C of the user 102. With reference to FIG. 9, a relationship 300 of these features is shown, where the pitch angle θ is:

$$\theta = a\tan 2(y, x) \quad (1)$$

In one implementation, to achieve the θ angle, a linear slider mounted near the base B of the actuator is used. The slider controls a position of armature r along length L and is driven by a motor that drives L but with a different gearing ratio. Instead of solving the nonlinear Eq. (1) for θ, it is possible to solve for the slider distance l, which is described by a similar triangle relationship between B, C, and the platform mount P.

This same relationship can also be expressed as:

$$l = \frac{Lr}{R} \quad (2)$$

Figure 10:
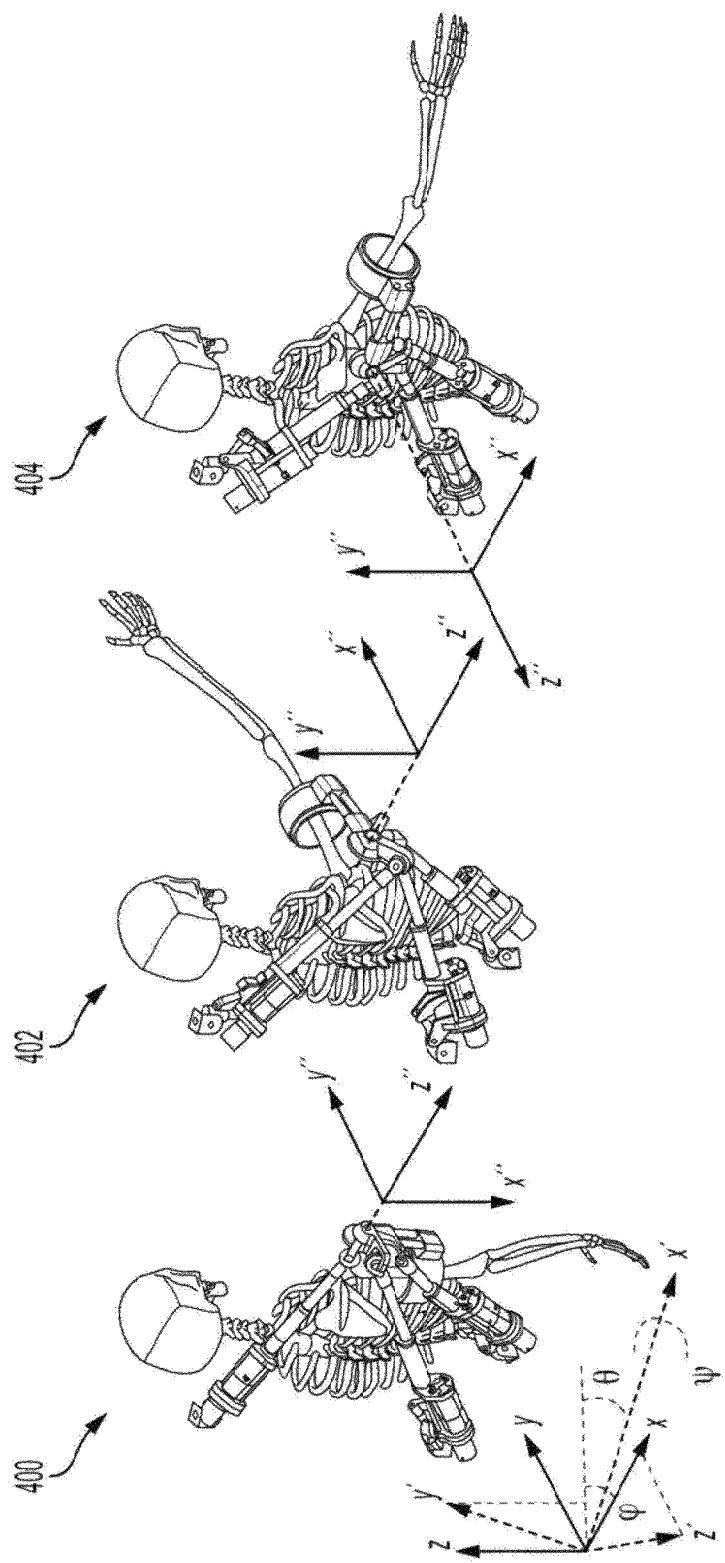
FIG. 10 is a series of illustrations showing an orientation of the shoulder exoskeleton for given arm directions.

Referring back to FIGS. 1-4, in one implementation, each actuator has position feedback sensors, for example, in the actuator assembly 132 to enable a closed-loop control. In one implementation, the stroke length of the top two actuators 108 and 110 may be 152.42 mm and the bottom actuator 112 may be 101.62 mm. The stroke lengths may be determined based on a workspace of the SPM of the shoulder exoskeleton 100. For example, these lengths may define the workspace to be approximately one octant of a sphere. Each actuator 108-112 may be configured such that the shoulder exoskeleton 100 operates on a spherical surface at a radius of 95.17 mm from the center of rotation of the shoulder of the user 102 or otherwise based on a comfort of the user 102.
Inverse Kinematics Turning to FIG. 10 showing a series of orientations 400-404 of the shoulder exoskeleton 100 for given arm directions. In one implementation, an inverse kinematic solution can be determined by first defining a local frame vector $\vec{x}$ to be collinear to a direction of the arm 104 of the user 102. The initial orientation of the local vector $\vec{z}$ can be expressed as the cross products of $\vec{x}$ and the global vector $\vec{z}$. The local vector $\vec{y}$ is the cross product of $\vec{z}$ and $\vec{x}$. It is necessary to multiply this initial set of orientation vectors RN by a rotation matrix $R_x$ about to keep the shoulder of the user 102 within the workspace of the three linear actuators. Hence, the new rotation matrix is:

$$R'' = R' R_x \tag{3}$$

where $$R' = \begin{bmatrix} x'_x & y'_x & z'_x \\ x'_y & y'_y & z'_y \\ x'_z & y'_z & z'_z \end{bmatrix} \tag{4}$$

$$R_x = \begin{bmatrix} 1 & 0 & 0 \\ 0 & \cos\psi & -\sin\psi \\ 0 & \sin\psi & \cos\psi \end{bmatrix} \tag{5}$$

Finding the angle $\psi$ that determines $R_x$ is done by first identifying a set of key orientations that define the workspace. For the shoulder exoskeleton 100, approximately one octant of a sphere may be used to define the workspace. The chosen orientation matrices at arm rest $R_r''$. ($\theta=-90°$, $\emptyset=90°$ or $0=-90°$, $\emptyset=0°$), arm flexion $R_f''$ ($\theta=0°$, $\emptyset=90°$), and arm abduction $R_a''$ ($\theta=0°$, $\emptyset=0°$) of the base 114 for the three corners of the octant are shown in FIG. 10. For these orientations, RO, RN, and $R_x$, respectively are:

$$R_r'' = \begin{bmatrix} 0 & 0 & 1 \\ 0 & 1 & 0 \\ -1 & 0 & 0 \end{bmatrix} = \begin{bmatrix} 0 & 0 & 1 \\ 0 & 1 & 0 \\ -1 & 0 & 0 \end{bmatrix}\begin{bmatrix} 1 & 0 & 0 \\ 0 & 1 & 0 \\ 0 & 0 & 1 \end{bmatrix} \tag{6}$$

or $$R_r'' = \begin{bmatrix} 0 & 0 & 1 \\ 0 & 1 & 0 \\ -1 & 0 & 0 \end{bmatrix} = \begin{bmatrix} 0 & 1 & 0 \\ 0 & 0 & -1 \\ -1 & 0 & 0 \end{bmatrix}\begin{bmatrix} 1 & 0 & 0 \\ 0 & 0 & 1 \\ 0 & -1 & 0 \end{bmatrix} \tag{7}$$

and $$R_f'' = \begin{bmatrix} 0 & 0 & 1 \\ 1 & 0 & 0 \\ 0 & 1 & 0 \end{bmatrix} = \begin{bmatrix} 0 & 0 & 1 \\ 1 & 0 & 0 \\ 0 & 1 & 0 \end{bmatrix}\begin{bmatrix} 1 & 0 & 0 \\ 0 & 1 & 0 \\ 0 & 0 & 1 \end{bmatrix} \tag{8}$$

$$R_a'' = \begin{bmatrix} 1 & 0 & 0 \\ 0 & 0 & -1 \\ 0 & 1 & 0 \end{bmatrix} = \begin{bmatrix} 1 & 0 & 0 \\ 0 & 0 & -1 \\ 0 & 1 & 0 \end{bmatrix}\begin{bmatrix} 1 & 0 & 0 \\ 0 & 1 & 0 \\ 0 & 0 & 1 \end{bmatrix} \tag{9}$$

It is important to note that the orientation of RN in equations (6)-(7) cannot technically be achieved, since $\vec{z} = \vec{x} \times \vec{z}$. However, for the purpose of solving for $\psi$, $R_r$ can be assumed to reach this orientation. For $R_x$ in equations (6)-(9), $\psi=0°$, $-90°$, $0°$, and $0°$, respectively. The $\psi$ function of $\theta$ and $\emptyset$ that satisfies $R_x$ at all of the key orientations is determined to be:

$$\psi = \sin(\theta)\left(\frac{\pi}{2} - \phi\right) \tag{10}$$

With a known orientation RO and a chosen radius of operation R, a chain of transformation matrices can then be used to describe the position of any point on the exoskeleton shoulder. For the location of an arbitrary mounting point described by $\vec{P}$ with respect to the local exoskeleton shoulder frame at R from the center of rotation, this transformation matrix T becomes:

$$T = \begin{bmatrix} R''_{1x} & R''_{2x} & R''_{3x} & R''_{3x}R \\ R''_{1y} & R''_{2y} & R''_{3y} & R''_{3y}R \\ R''_{1z} & R''_{2z} & R''_{3z} & R''_{3z}R \\ 0 & 0 & 0 & 1 \end{bmatrix}\begin{bmatrix} 1 & 0 & 0 & P_x \\ 0 & 1 & 0 & P_y \\ 0 & 0 & 1 & P_z \\ 0 & 0 & 0 & 1 \end{bmatrix} \tag{11}$$

With the location of base mounting point $\vec{D}$ known and the platform mounts described by translational components of T known, the length of each actuator $L_i$ is the Euclidean distance between its respective mounting points:

$$L_i = \sqrt{(T_{14_i} - D_{x_i})^2 + (T_{24_i} - D_{y_i})^2 + (T_{34_i} - D_{z_i})^2} \tag{12}$$

Forward Kinematics

Forward kinematics of the SPM of the shoulder exoskeleton 100 may be solved using position feedback sensors, as described in more detail herein. The endpoint of each actuator is found from both angles and the stroke length. The position and orientation of the platform is found from the three actuator endpoints.

Slip Mechanism

As described herein, in one implementation, the slip mechanism 106, used in the shoulder exoskeleton 100 for preventing the adverse effects of joint misalignment 204, consists of a passive cuff joint with one translational DoF and one rotational DoF. The internal cuff 136 of this joint has a compliant padded interior which is designed to stay in contact with an upper portion of the arm 104 of the user 102. The external cuff 136 is connected to the shoulder exoskeleton 100. When the joint misalignment 204 between the center of rotation of the glenohumeral joint of the user 102 and the center of rotation 120 of the shoulder exoskeleton 100 occurs, the internal cuff 136 translates within the external cuff 134 as shown in FIG. 5. In addition to translational slip 200 (S), the joint misalignment 204 will affect the orthogonal relationship between the cross-section of the cuffs 134 and 136 and the arm 104 of the user 102. This cuff misalignment angle 202 (ω) is shown in FIG. 5. The compliance of the padding of the internal cuff 136 allows for a degree of angular misalignment 202 to occur without harm to the user 102 or the shoulder exoskeleton 100. The internal cuff 136 may permit 3 cm or other predefined amount of diametral padding deformation. A maximum angular misalignment is a function of this allowable deformation and of a diameter of the arm 104 of the user 102.

A joint misalignment vector $\bar{v}_{mis}$ can be in any direction. However, a maximum translational slip $S_{max}$ will always occur when the arm 104 direction vector $\bar{v}_{user}$ is collinear to $\bar{v}_{mis}$, for which $S_{max}=1$ $v_{mis}$ 1. This case of maximum slip is exemplified in FIG. 5 for which horizontal joint misalignment has occurred and the arm 104 is at a 90° abduction angle from the resting position. A maximum cuff misalignment angle $\omega_{max}$, is also shown in FIG. 5 and occurs at the resting position when $\bar{v}_{mis}$ is orthogonal to $\bar{v}_{user}$.

Shoulder Exoskeleton System Validation

As described herein, the shoulder exoskeleton 100 presents a 5-DoF shoulder exoskeleton using parallel actuation and an integrated passive slip mechanism. By using a parallel architecture, the shoulder exoskeleton 100 offers a low inertia solution to limb actuation, which is important with regards to energy cost and a performance of wearable devices. A method of modular motion coupling is also disclosed that may be used to develop this type of SPM with a single kinematic solution. Finally, the shoulder exoskeleton 100 uses the slip mechanism for negating adverse effects of joint misalignment and allows the SPM in particular to be used to emulate the complex motion of the human shoulder. It is important to note that this idea of allowing mechanical slip could be extended to include the rest of the arm as well. For a full arm exoskeleton, a secondary slip mechanism may be disposed at a lower portion of the arm 104, for example, after the elbow joint.

Figure 11:
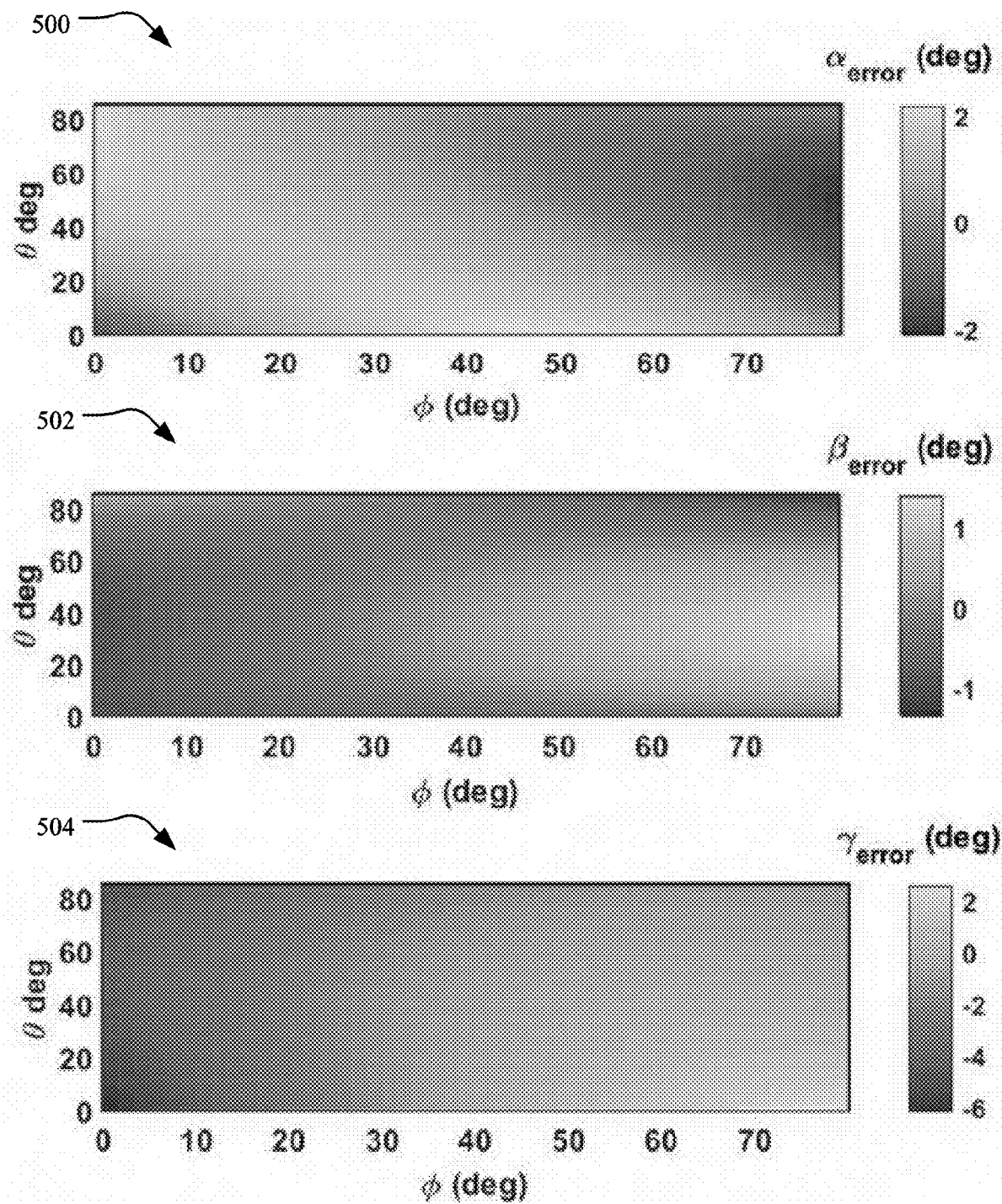
FIG. 11 is a set of graphs showing an error between an actual and a commanded shoulder orientation expressed using Z-X-Z Euler angles $\alpha$, $\beta$, $\gamma$.
Figure 12:
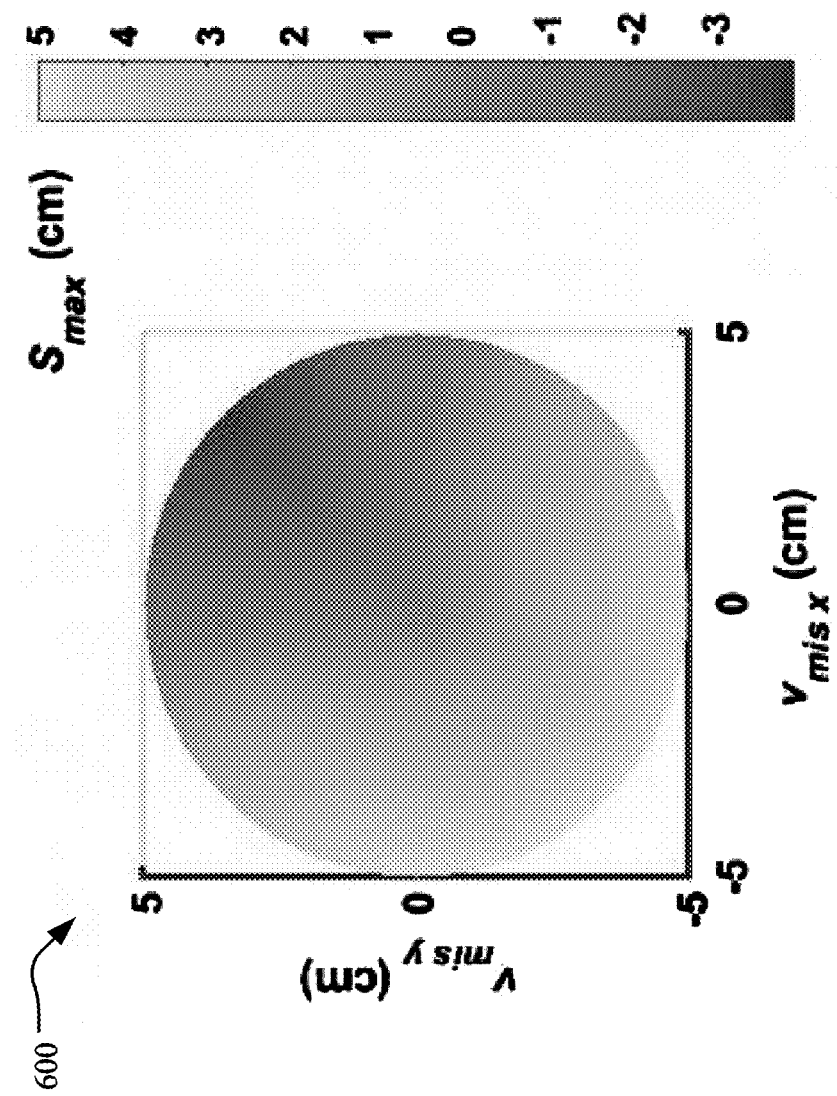
FIG. 12 is a graphical representation showing a maximum translation slip $S_{max}$ of a given planar misalignment $v_{mis}$.
Figure 13:
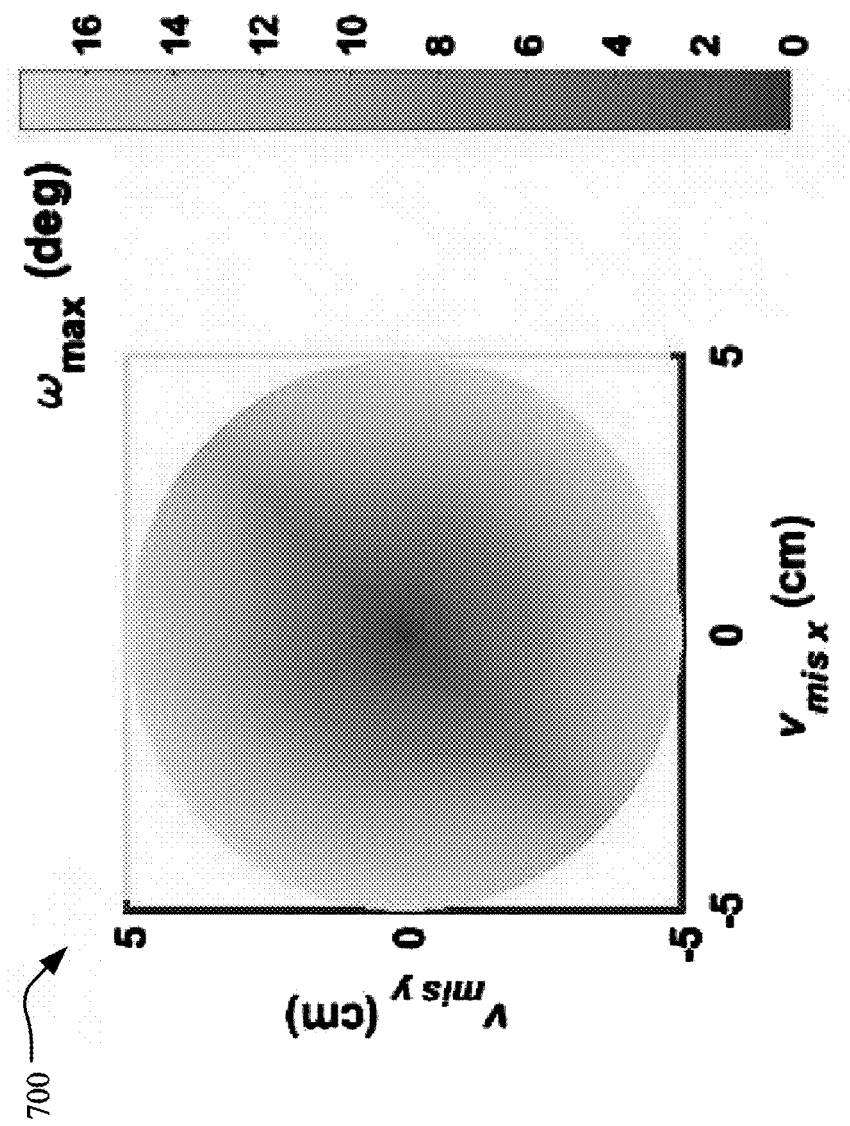
FIG. 13 is a graphical representation showing a maximum cuff misalignment angle $\omega_{max}$ for a given planar misalignment $v_{mis}$.

As described below with reference to FIGS. 11-13, a validation of the kinematics of the SPM of the shoulder exoskeleton 100 is demonstrated using motion capture, showing mean Euler angle errors of 1.01°, 0.46°, and 1.87° for α, β, and γ, respectively. Contribution of error includes compliance of 3D printed materials used in the construction of the actuators, low machining tolerances associated with in-house fabrication, and a placement tolerance of 3 mm for the base mounting brackets. Additionally, a computational model to simulate the maximum translation slip S and the cuff misalignment angle α was created. This model demonstrates the values of S and ω expected during operation.

To validate the kinematics, VICON motion capture was used. Markers were placed on the base 114 and tracked by a set of four motion capture cameras throughout a grid trajectory that varied both θ and Ø in 5° increments. The range of θ and Ø were determined experimentally and a conservative choice of 0°≤θ≤−85° and 0°≤Ø≤80° were used to ensure that a joint limit would not be reached. Both θ and Ø are functional to the placement and maximum stroke length of each actuator 108-112. Adjusting either of these parameters will affect the workspace. The placed markers were then used to reconstruct the local frame, which was compared to the commanded orientation at each grid point. The comparison was done using z-x-z Euler angles. The difference between each set of angles with respect to the corresponding θ and Ø angles are presented in graphs 500-504 shown in FIG. 11 for each Euler angle. The results showed mean Euler angle errors of $\alpha_{mean}=1.01°$, $\beta_{mean}=0.46°$, and $\gamma_{mean}=1.87°$. The variance of the Euler angles were calculated to be 1.18, 0.3, and 3.46 for α, β, and γ, respectively.

To quantify the translation slip S and the cuff angular misalignment ω a computational slip model was constructed. The model uses the joint misalignment vector $\bar{v}_{mis}$, the user's arm direction vector $\bar{v}_{user}$, and a zero cuff position at 166 mm from the center of rotation as inputs. In this model, the convention chosen is that θ exists in quadrant III (+x,+y) of the plane and that positive joint misalignment exists in quadrant I (−x,−y). The model results 600 and 700 in FIG. 12 and FIG. 13 show $S_{max}$, and $\omega_{max}$, respectively, across a complete 90° degree variation of the θ. It can be observed from FIG. 12 that $S_{max}$, is minimized for planar joint misalignment when the joint misalignment vector is in the opposing direction to $\bar{v}_{user}$. at θ=−45°. In FIG. 13, it can be observed that $\omega_{max}$, is minimized for planar joint misalignment when $\bar{v}_{mis}$ is collinear to $\bar{v}_{user}$ at θ=−45°.

Apart from being a unique device, the shoulder exoskeleton 100 could be utilized for rehabilitation, augmentation, and/or within other contexts. For example, it could be used for forms of upper limb rehabilitation that are sensitive to the effects of joint misalignment. In regards to assistive applications, the shoulder exoskeleton 100 could be mounted to an electric wheelchair to help those with upper limb impairments. Another application would be to integrate proximity sensors or piezoelectric foam into the arm cuff 134 and/or 136 to allow for a different control method targeted at augmentation for industrial or military purposes. Other applications are also contemplated.

Shoulder Exoskeleton Control System

Figure 14:
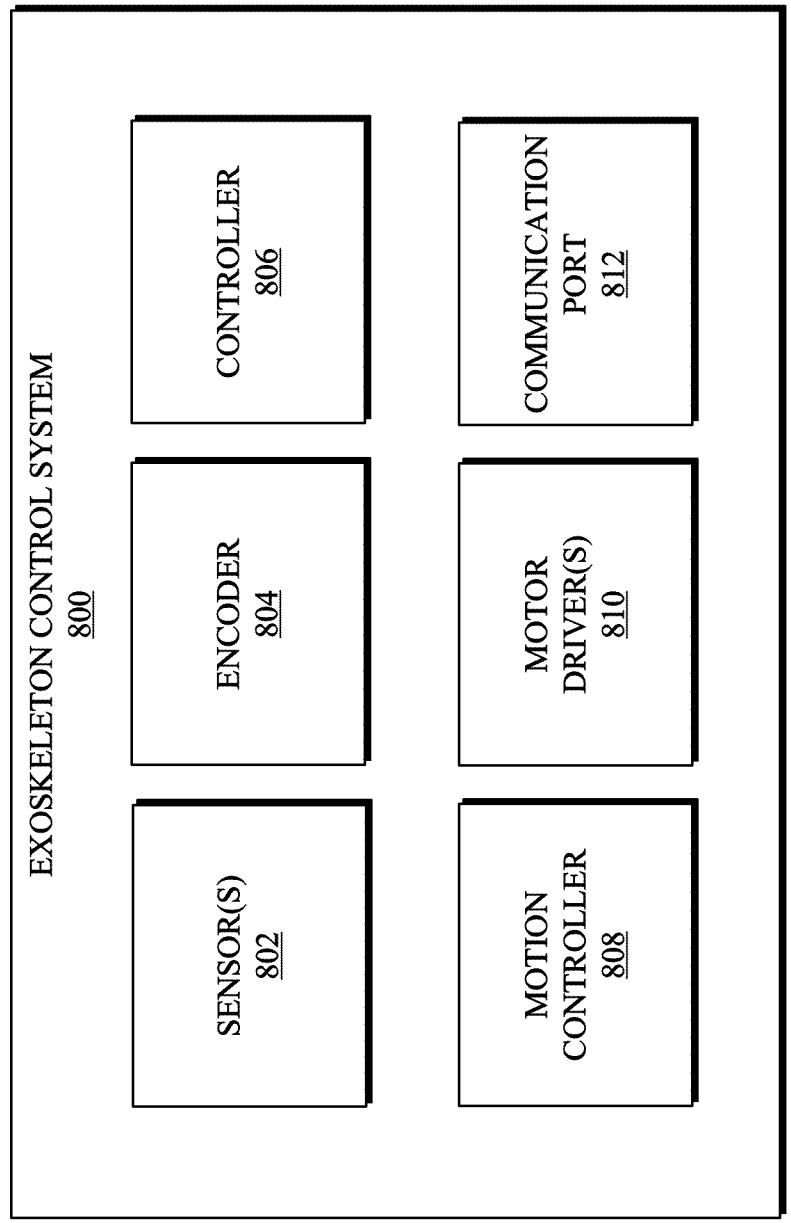
FIG. 14 is an example block diagram of an example exoskeleton control system.
Figure 15:
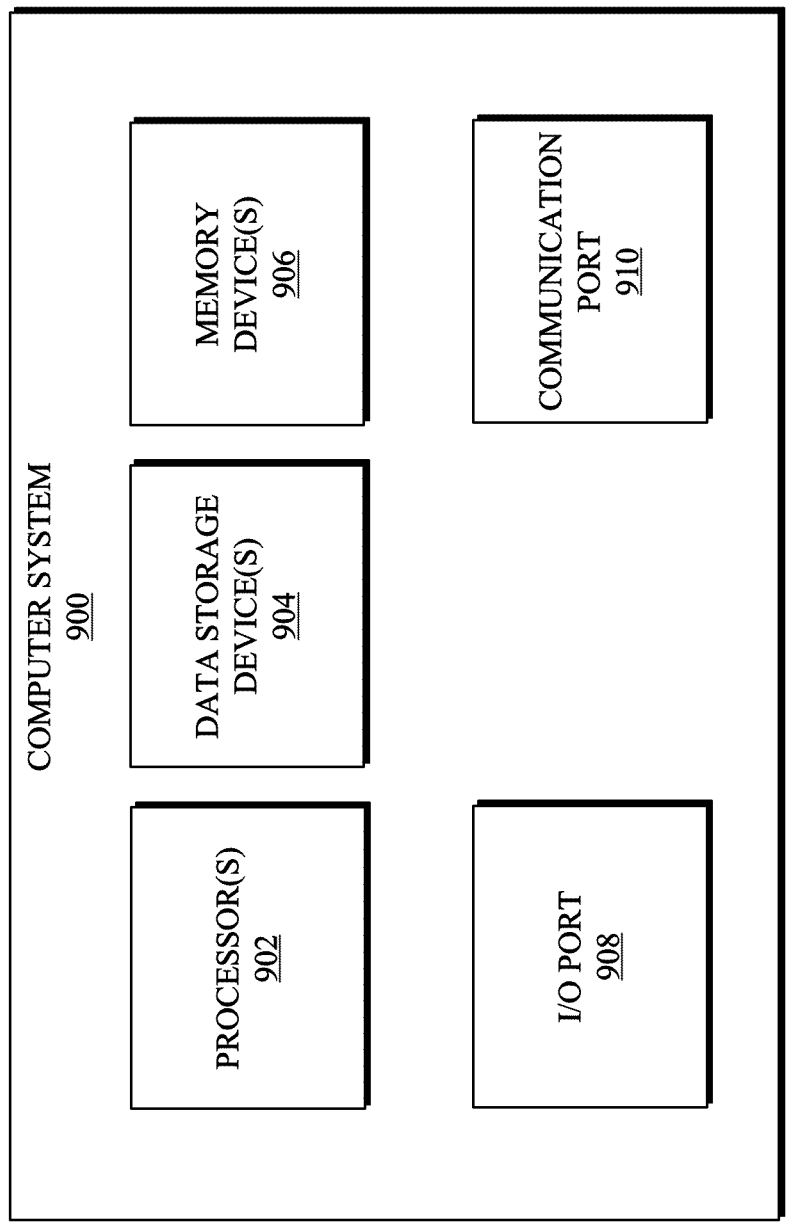
FIG. 15 is an example computing system for implementing various aspects of the presently disclosed technology.

Turning to FIGS. 14-15, the shoulder exoskeleton 100 may be controlled using an exoskeleton control system 800. In one implementation, the exoskeleton control system 800 includes one or more sensors 802 (e.g., position feedback sensors), an encoder 804, a controller 806, a motion controller 808, one or more motor drivers 810, and a communication port 812. The exoskeleton control system 800 may be associated with one or more of the actuators 108-112.

In one implementation, the forward kinematics of the SPM of the shoulder exoskeleton 100 are solved using the one or more sensors 802, such as position feedback sensors. Each actuator 108-112 is equipped with the encoder 804, for example, a Karlsson Robotics E6C2, having a resolution of 1024 pulses/rotation, to record the coupled pitch and stroke length. The roll of each actuator 108-112 is measured using the one or more sensors 802, such as a 10K ohm potentiometer, for example, a Bourns 3590S. The endpoint 126 of each actuator 108-112 is found from both angles and the stroke length. The position and orientation of the platform is found from the three actuator endpoints.

To operate the shoulder exoskeleton 100, the exoskeleton control system 800 may be in communication with a computing system 900 via the communication port 812, which may involve a wired and/or wireless connection. In one implementation, the θ and Ø angles are commanded using the computing system 900 in 5° increments. The computing system 900 may generate the forward and inverse kinematics based on a desired position and sends new position and velocity commands via serial communication to the controller 806, for example a Arduino Mega 2560. The controller 806 may alternatively generate the forward and inverse kinematics. The controller 806 then relays the position commands to corresponding PID motion controller(s) 808, for example a Kangaroo 2x Motion Controller, which are connected to the motor driver(s) 810, for example a SyRen 10A Regenerative Motor Driver. Each motion controller 808 may be in a feedback loop with its respective encoder 804 and limit switches of the actuator. Once the desired positions are met, a secondary feedback loop alerts the computing system 900 and/or controller 806 that the motion controller 808 is ready to execute the next set of user commands.

Referring to FIG. 15, a detailed description of an example computing system 900 having one or more computing units that may implement various systems and methods discussed herein is provided. The computing system 900 may be applicable to the actuator assembly, the exoskeleton control system, and/or other computing or network devices. It will be appreciated that specific implementations of these devices may be of differing possible specific computing architectures not all of which are specifically discussed herein but will be understood by those of ordinary skill in the art.

The computer system 900 may be a computing system is capable of executing a computer program product to execute a computer process. Data and program files may be input to the computer system 900, which reads the files and executes the programs therein. Some of the elements of the computer system 900 are shown in FIG. 15, including one or more hardware processors 902, one or more data storage devices 904, one or more memory devices 908, and/or one or more ports 908-910. Additionally, other elements that will be recognized by those skilled in the art may be included in the computing system 900 but are not explicitly depicted in FIG. 15 or discussed further herein. Various elements of the computer system 900 may communicate with one another by way of one or more communication buses, point-to-point communication paths, or other communication means not explicitly depicted in FIG. 15.

The processor 902 may include, for example, a central processing unit (CPU), a microprocessor, a microcontroller, a digital signal processor (DSP), and/or one or more internal levels of cache. There may be one or more processors 902, such that the processor 902 comprises a single central-processing unit, or a plurality of processing units capable of executing instructions and performing operations in parallel with each other, commonly referred to as a parallel processing environment.

The computer system 900 may be a conventional computer, a distributed computer, or any other type of computer, such as one or more external computers made available via a cloud computing architecture. The presently described technology is optionally implemented in software stored on the data stored device(s) 904, stored on the memory device(s) 906, and/or communicated via one or more of the ports 908-910, thereby transforming the computer system 900 in FIG. 15 to a special purpose machine for implementing the operations described herein. Examples of the computer system 900 include personal computers, terminals, workstations, mobile phones, tablets, laptops, personal computers, multimedia consoles, gaming consoles, set top boxes, and the like.

The one or more data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 906 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 900 includes one or more ports, such as an input/output (I/O) port 908 and a communication port 910, for communicating with other computing, network, or vehicle devices. It will be appreciated that the ports 908-910 may be combined or separate and that more or fewer ports may be included in the computer system 900.

The I/O port 908 may be connected to an I/O device, or other device, by which information is input to or output from the computing system 900. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 900 via the I/O port 908. Similarly, the output devices may convert electrical signals received from computing system 900 via the I/O port 908 into signals that may be sensed as output by a human, such as sound, light, and/or touch. The input device may be an alphanumeric input device, including alphanumeric and other keys for communicating information and/or command selections to the processor 902 via the I/O port 908. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 900 via the I/O port 908. For example, an electrical signal generated within the computing system 900 may be converted to another type of signal, and/or vice-versa. In one implementation, the environment transducer devices sense characteristics or aspects of an environment local to or remote from the computing device 900, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 900, such as, physical movement of some object (e.g., a mechanical actuator), heating or cooling of a substance, adding a chemical substance, and/or the like.

In one implementation, a communication port 910 is connected to a network by way of which the computer system 900 may receive network data useful in executing the methods and systems set out herein as well as transmitting information and network configuration changes determined thereby. Stated differently, the communication port 910 connects the computer system 900 to one or more communication interface devices configured to transmit and/or receive information between the computing system 900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 910 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 910 may communicate with an antenna or other link for electromagnetic signal transmission and/or reception.

In an example implementation, exoskeleton control data, kinematics, motion data, and software and other modules and services may be embodied by instructions stored on the data storage devices 904 and/or the memory devices 906 and executed by the processor 902. The computer system 900 may be integrated with or otherwise form part of the shoulder exoskeleton 100.

The system set forth in FIG. 15 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An exoskeleton system for a user having a shoulder and an arm, the exoskeleton system comprising:
   a plurality of linear actuators forming a spherical parallel manipulator, each of the plurality of linear actuators having an actuator endpoint wherein a motion of each of the actuator endpoints individually defines an arc of motion;
   wherein a motion of one or more of the plurality of linear actuators alters a position of each of the remaining linear actuators such that the motion of each of the plurality of linear actuators is dependent upon each of the remaining linear actuators;
   the spherical parallel manipulator applying a force component tangential to the motion of each of the actuator endpoints across an entirety of the arc of motion, wherein the force component is generated by a combination of forces applied from each of the plurality of linear actuators;
   a cuff connectable to the arm of the user; and
   a base connecting the spherical parallel manipulator to the cuff.

2. The exoskeleton system of claim 1, wherein the plurality of linear actuators includes three linear actuators.

3. The exoskeleton system of claim 1, wherein the plurality of linear actuators are each connected to the base with a tie-rod joint.

4. The exoskeleton system of claim 1, wherein the cuff provides a rotational degree-of-freedom and a translational degree-of-freedom.

5. The exoskeleton system of claim 1, wherein each of the linear actuators has a plurality of degrees-of-freedom.

6. The exoskeleton system of claim 5, wherein the plurality of degrees-of-freedom includes at least one rotational degree-of-freedom and at least one translational degree-of-freedom.

7. The exoskeleton system of claim 6, wherein the at least one rotational degree-of-freedom includes at least one of roll or pitch.

8. The exoskeleton system of claim 6, wherein the at least one translational degree-of-freedom includes stroke.

* * * * *